Figure 8:
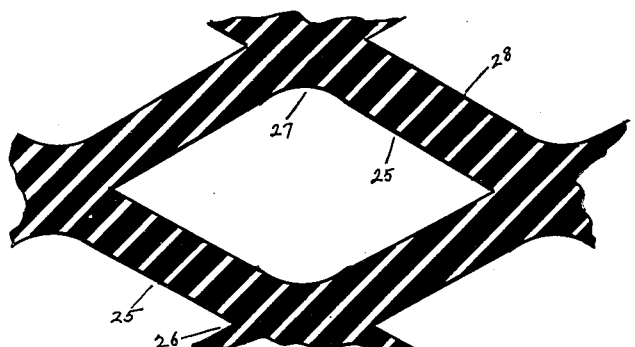

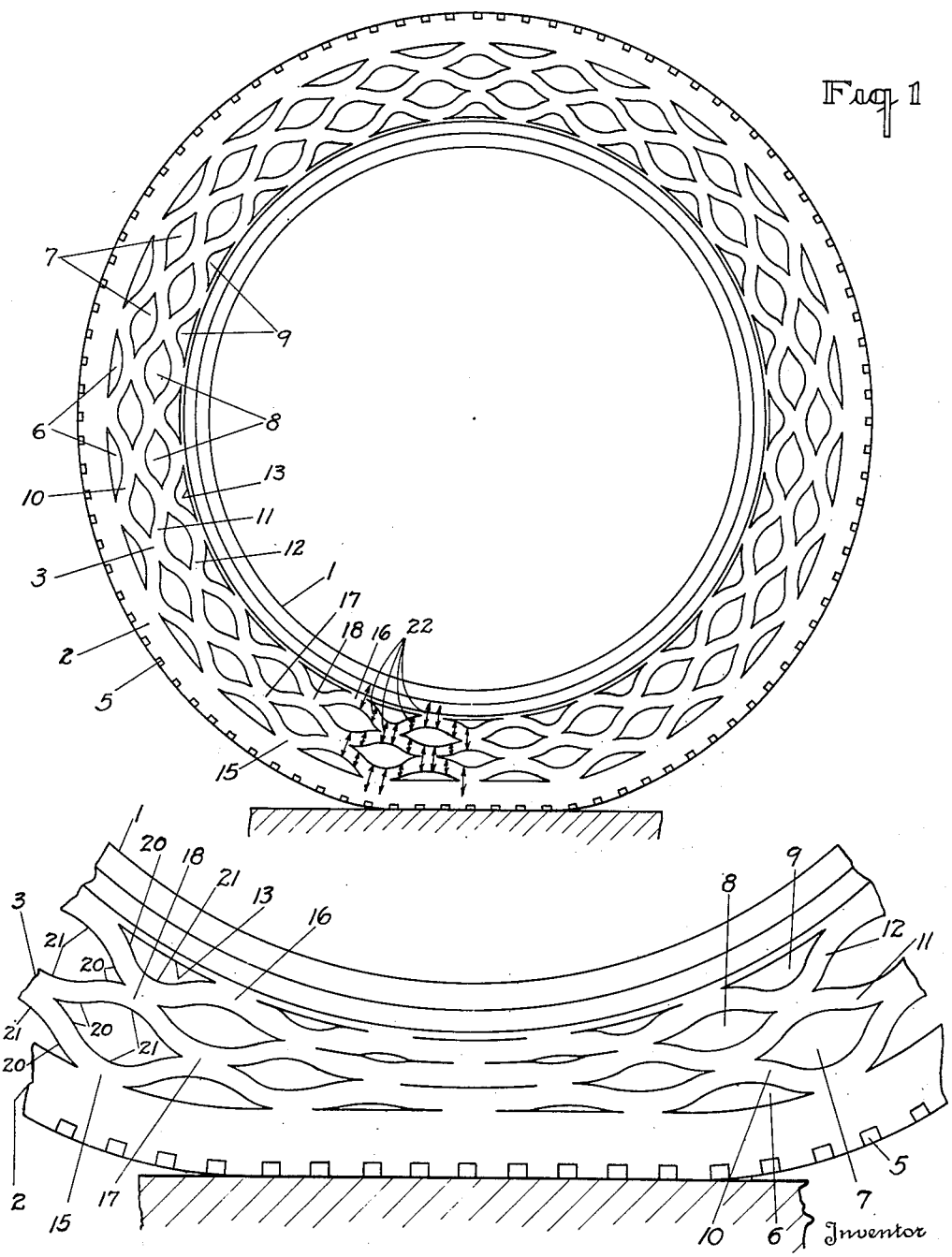

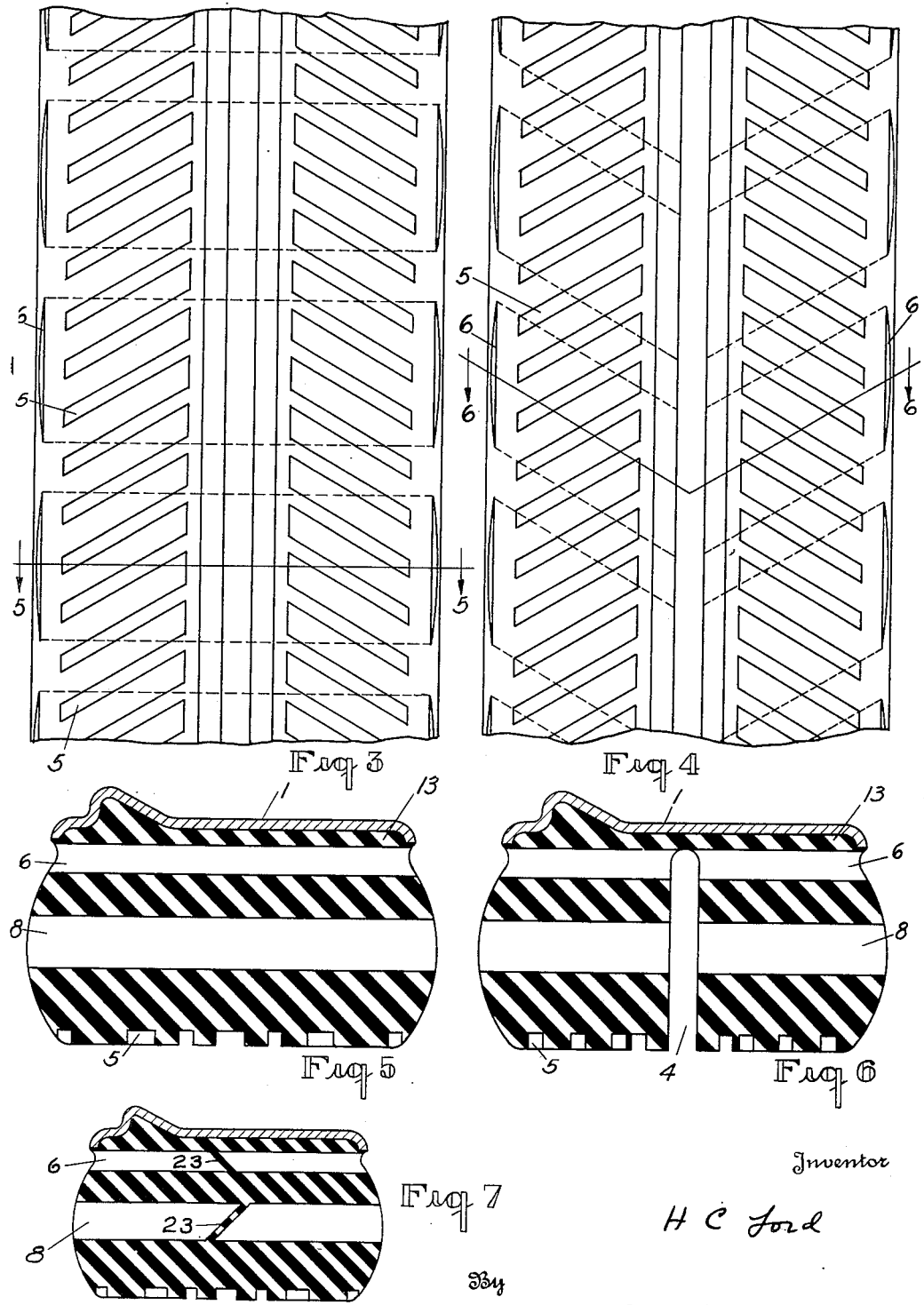

Dec. 9, 1952 H. C. LORD 2,620,844
CUSHIONED TIRE

Filed April 27, 1950 3 Sheets-Sheet 3

INVENTOR.
Hugh C Lord
BY Ralph Hammar
Attorney

Patented Dec. 9, 1952

2,620,844

UNITED STATES PATENT OFFICE 2,620,844

CUSHIONED TIRE

Hugh C. Lord, Erie, Pa., assignor to Lord Manufacturing Company, Erie, Pa., a corporation of Pennsylvania Application April 27, 1950, Serial No. 158,530

5 Claims. (Cl. 152—326)

This application is a continuation in part of my application Serial No. 560,380, filed October 26, 1944, now abandoned.

The invention relates to cushioned tires, by which is meant tires that are not inflated. As usually made, such tires are formed of annular bodies of solid rubber that act in compression in sustaining loads imposed upon them, and which are accordingly relatively stiff and unyielding. Such tires are, however, different from spring wheels in that the tread is free to move locally to accommodate irregularities in the road surface without displacing the axis of the wheel. Such tires are also different from pneumatic tires where the driving and braking forces are taken by a reinforced casing which because of the reinforcement is less able to accommodate local irregularities in the road surface.

This invention provides a cushioned tire of resilient material such as rubber which is so formed that normal radial loads are transmitted principally by shear on such bodies. Rubber in shear is much softer than rubber in direct stress (compression or tension). In the rubber art it is common to prevent shear deflection by fabric or metal inserts extending transverse to the direction of shear deflection. Inserts extending in the direction of shear deflection stiffen the resistance to forces crosswise of the inserts but without affecting the shear stiffness. Rubber is free to deflect in shear (1) when there are no inserts transverse to the direction of shear deflection or when the inserts extend in the direction of shear deflection and (2) when there is sufficient clearance to permit the shear deflection. If there is insufficient clearance for the shear deflection, the shear deflection cannot take place since rubber is incompressible. This is well understood in the rubber art.

The tire comprises an inner rim which is formed of rigid material such as steel and is shaped to be mounted upon a wheel, an outer continuous tread section which is formed of resilient material such as rubber, and a cushion formed of like resilient material extending between and connected or united to the rim and tread section so the cushion not only sustains the gravity loads but also the driving and braking forces and side stresses.

The cushion is provided with openings that extend from one to the other side of the tire and are formed by walls which extend in a general annular direction entirely around the tire, the walls being formed to transmit generally in shear normal loads that act radially between the rim and tread. In a preferred form the walls extend at an angle to the radial of the order of 30–60° so the walls are at an angle to both the radial and circumferential. This tends to give better resistance to friction loads. The walls also are of substantially uniform cross section so the shear deflection per unit length is the same throughout the length of the walls. This helps prevent localized stress in the rubber. The transverse openings in the cushion are arranged in series around the tire, there preferably being a plurality of such series each at a different radial distance from the center of the tire. When the cushion is provided with a plurality of annular series of openings, the openings that constitute one of the series are preferably staggered angularly around the axis of the tire with relation to the openings that constitute each adjacent series thereof and with the openings in one series nested between and overlapping the openings of an adjacent series.

Each of the transverse openings formed in the cushion preferably has greater annular length circumferential dimension than the radial width, and faces of walls that form the openings have sharp corners at their ends. In a preferred form the walls are convex at the end portions of the openings and concave between the end portions so that the openings close progressively from their narrow ends towards their wide central portions when loads are transmitted radially by the walls of the openings.

Figure 9:
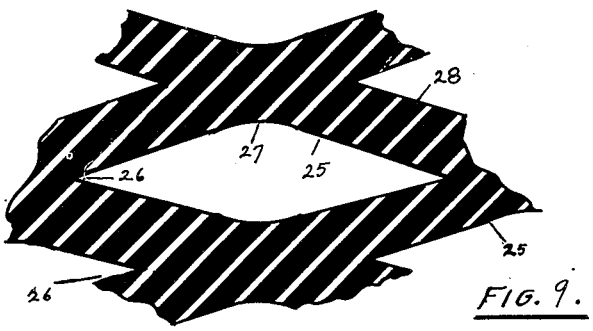

The invention is illustrated in the accompanying drawings of which Fig. 1 is a side view of a tire embodying the invention, the tire being shown as being distorted under a normal load; Fig. 2 is a somewhat enlarged side view of the lower portion of the tire when distorted or collapsed under an excessive load or heavy shock; Fig. 3 a face view of a portion of the tread of the tire; Fig. 4 a view similar to Fig. 3 showing a modification of construction; Fig. 5 a transverse sectional view of the tire taken on the line 5—5, Fig. 3; Fig. 6 a transverse sectional view taken on the broken line 6—6, Fig. 4; Fig. 7 is another modification; Fig. 8 is an enlarged fragmentary view of a modification of the cushion section of the tire under no load condition; and Fig. 9 is a similar view under load.

In the specific embodiment of the invention the tire is shown as comprising an inner annular rim 1 which is shaped to be mounted and locked on the wheel of a vehicle, airplane, and the like. United to the outer face of the rim, as by bonding, there is an integral body of resilient material such as rubber which constitutes an outer continuous tread 2 and a cushion section 3 that extends between the rim and tread. Both the tread and cushion are free to yield locally in radial directions because there are no circumferentially extending metal or fabric inserts which would restrain such local yielding. Nor are there any circumferentially extending members for transmitting forces from the point of contact with the road to parts of the tread and cushion out of contact with the road. As shown in Fig. 5, the tire may be formed in one section, and as shown in Fig. 6 it may be divided into two annular sections by a medial annular slot 4 which gives the general effect that attends multiple-section solid tires, and also facilitates molding of the cushion section of the tire. To increase traction and to resist skidding, the tread faces of the tire may be provided with any desired indentations, those shown in the drawing being inclined slots 5 which give a herringbone appearance and effect.

The cushion section 3 of the illustrated tire has four annular series of openings that extend from one to the other side of the tire, the openings constituting the several series from the outermost to the innermost being indicated, respectively by the numerals 6, 7, 8, and 9. In the embodiment of the invention illustrated in Fig. 3 these openings extend parallel to the axis of the tire, and in the embodiment illustrated in Fig. 4 they are inclined to the axis. The openings 6 are formed between the inner surface of tread section 2 and a wall 10 which extends annularly around the tire and is preferably of a sinuous shape. The openings 7 constituting the next series thereof are formed between wall 10 and a like wall 11, those indicated at 8 constituting the series which are formed between wall 11 and a like wall 12, which latter wall, together with the outer face of an annular strip of rubber 13 that is bonded to the outer face of rim 1, form the inner annular series of openings 9. By thus forming the openings by walls which are substantially of uniform thickness and are of the sinuous shape illustrated, the openings constituting adjacent series thereof are staggered angularly around the tire with the openings in one series nested between and overlapping the openings of an adjacent series.

Where the outer face of wall 10 merges at spaced intervals with the inner face of tread section 2, supports 15 are formed for this wall, and where the inner face of wall 12 merges with strip 13 supports 16 are formed for such wall. Similarly, where the inner face of wall 10 merges with the outer face 11 supports 17 are formed, and where the inner face of wall 11 merges with the outer face of wall 12 supports 18 are formed. It is through these supports that loads are transmitted between the rim and tread in a manner presently to be explained.

While the sinuous opening-forming and stress-transmitting walls 10, 11 and 12 may be variously shaped to form in effect a lattice structure between the rim and tread section of the tire, such walls are preferably of the reverse curved shape that is illustrated. The adjacent faces of the walls that form each of the openings 7 and 8 are convex at the ends of each opening as shown at 20, and these convex faces merge into concave faces 21 which extend throughout the medial portion of each such opening. Similar convex and concave faces 20 and 21, respectively, form one side of each of openings 6 and 9, the other sides of these openings being bounded by cylindrical faces.

The transmission of load forces from tread support 15 of wall 10 shown at the lower portion of Fig. 1 to rim supports 16 of wall 12 is generally indicated by a series of double-headed arrows 22 which extend radially on walls 10, 11, and 12 to show that normal load stresses are transmitted by these walls principally in shear. The unloaded relative positions of parts of the tires are shown throughout Fig. 1, except at its lower road-contacting portion which shows the distortion of parts of the tire when it is radially compressed by a normal load. Fig. 2 shows the distortion of parts of the tire when it is radially compressed by an excessive load or a heavy shock. As best seen in Fig. 2, when the load stresses gradually increase, the narrow ends of the openings gradually and proportionally close by reason of the convex faces 20 at such ends being brought into contact with each other. As seen in Fig. 1, when the tire is subjected to normal loads the openings 6, 7, 8, and 9 close only in proportion to the load, and consequently the load is sustained by the relatively soft shear resistance of the uncontacting portions of walls 10, 11, and 12. When the tire is subjected to excessive abnormal loads or severe shocks the openings entirely close as shown in Fig. 2, in which event the entire body of the rubber constituting the loaded portion of the tire acts in compression.

As has been stated, the transverse openings 6, 7, 8, and 9 of the tire shown in Fig. 3 extend parallel to the axis of the tire, while in Fig. 4 they are shown as extending in directions oblique to the axis. In the latter case the partial or complete closing of each opening is progressive from one to the other side of the tire, whereas in the arrangement of openings shown in Fig. 3 the partial or complete closing of each opening is substantially uniform from one to the other side of the tire. Thus, the form of tire shown in Fig. 4 tends to reduce or eliminate small vibrations that may occur in the use of the tire of Fig. 3.

In the modification of Fig. 7, which is in other respects identical with Fig. 5, the openings do not extend completely from one to the other side of the tire. This may be preferable for molding since the mold cores forming the respective openings can extend from both sides of the mold. The web 23 between the inner ends of the mold cores does not materially affect the characteristics and may have its shape selected for ease in molding. The particular shape illustrated responds primarily in shear to load deflection and therefore has a minor effect on the normal operation of the tire, Under shock conditions the web causes a slightly more rapid shift from shear to compression in the loaded portion of the tire.

In the form shown in Fig. 6 there is a centrifugal circulation of air inward from the outer ends of the openings 6, 7, 8, 9 toward the slot 4 and radially outward through the slot. The air circulation prevents overheating of the tire and increases the tire life.

The cushioning action is illustrated in the enlarged fragmentary views Figs. 8 and 9. In these views, the openings 25 are roughly diamond shape, as are the openings 7 and 8 of the previously described construction, and have sharp corners 26 at the ends and radially displaced junctions 27 having rounded corners. The openings are formed by walls 28 extending at an angle to both the radial and circumferential, the respective angles for the unloaded condition illustrated in Fig. 8 being 60° to the radial and 30° to the circumferential, it being understood that these angles are subject to variation. The walls 28 are of substantially uniform radial thickness thereby using the least amount of rubber for the desired cushioning action.

Under radial loads, the walls 28 deflect in shear and, as is characteristic of shear deflection, the walls maintain the same radial thickness and are merely deflected through an angle known as the shear angle. The load is transmitted from the rounded junctions 27 through the walls 28 to the sharp corners 26. Under load, the rounded junctions 27 open and the sharp corners 26 close. The opening of the junctions does not produce localized stress in the rubber because the stress is distributed over the rounded surfaces. The closing of the sharp corners 26 likewise do not produce any localized stress in the rubber. If the corners 26 were rounded, there would be localized buckling or creasing which cause overstressing of the rubber resulting in overheating and ultimate failure.

Of course the tire, except when standing still is subject to braking and traction loads. These loads act in circumferential directions and tend to shift the outer junctions 27 angularly with respect to the inner junctions.

The rounding of the junctions 27 prevents localizing of stresses due to the braking and traction loads. These loads are transmitted along the walls 28 and to the corners 26. The sharp corners prevent localized stress since circumferential displacement of the corners does not tend to open the corners and tear the rubber. If the corners 26 were rounded, there would be a localized stress or buckling which would be accentuated as the rubber was weakened by corresponding localized heating.

In all of the constructions, the cushioning is obtained by shear stress of the walls 10, 11, 12, 28 all of which extend at an angle to both the circumferential and radial and all of which are free to deflect through the necessary shear angle. The shear deflection would not be present if the walls did not extend circumferentially or if the walls had fabric or metal reinforcements preventing shear deflection or if the openings 6, 7, 8, 9, 25 did not provide clearance for shear deflection. The walls can be described as free to deflect in shear because of the absence of structure preventing shear deflection.

What is claimed as new is:

1. A cushioned tire comprising an inner rim, an outer continuous tread section, and a cushion formed of resilient material such as rubber extending between and connected to said rim and tread section and free to yield inward locally at the point of contact of the tread with the road, said cushion being of lattice section with staggered openings separated by walls extending at an angle to the radial and having ends anchored and intermediate portions free to yield radially in shear, the wall faces of the openings being convex at and concave between their end portions whereby the transmission of loads from one to the other of said rim and said tread section causes the openings to close progressively from their narrow ends towards their wide central portions.

2. A cushioned tire comprising an inner rim, an outer continuous tread section, and a cushion formed of resilient material such as rubber extending between and united to said rim and tread section, said tread and cushion sections being free to yield locally in all directions at the point of contact of the tread with the road, said cushion being of lattice section with staggered overlapping openings separated by walls extending at an acute angle to the radial and having radially spaced ends anchored and intermediate portions free to yield radially in shear, the openings having side faces extending from sharp corners at the ends to radially displaced junctions intermediate the ends and having rounded corners.

3. A cushioned tire comprising an inner rim, an outer continuous tread section, and a cushion formed of resilient material such as rubber extending between and united to said rim and tread section, said tread and cushion sections being free to yield locally in all directions at the point of contact of the tread with the road, said cushion being of lattice section with staggered overlapping openings separated by walls extending at an acute angle to the radial and having radially spaced ends anchored and intermediate portions free to yield radially in shear, the openings having side faces flaring with increasing rate of divergence from sharp corners at the ends toward radially displaced junctions intermediate the ends and having rounded corners.

4. A cushioned tire comprising an inner rim, an outer continuous tread section, and a cushion formed of resilient material such as rubber extending between and united to said rim and tread section, said tread and cushion sections being free to yield locally in all directions at the point of contact of the tread with the road, the sides of the cushion being exposed to the air, said cushion being of lattice section with staggered openings separated by walls extending at an acute angle to the radial and having radially spaced ends anchored and intermediate portions free to yield radially in shear, the openings forming passages through the cushion for the circulation of cooling air, and the openings having side faces extending from sharp corners at the ends to radially displaced junctions intermediate the ends and having rounded corners.

5. A cushioned tire comprising an inner rim, an outer continuous tread section, and a cushion formed of resilient material such as rubber extending between and united to said rim and tread section, the tread and cushion sections being free to yield locally in all directions at the point of contact of the tread with the road, said cushion being of lattice section with openings arranged in radially displaced tiers with the openings in one tier nested between the openings in a radially adjacent tier, the openings being separated by walls of substantially uniform sectional thickness extending at an acute angle to the radial and having radially displaced ends anchored and intermediate portions free to yield radially in shear, and the openings having side faces extending from sharp corners at the ends of the openings to radially displaced junctions intermediate the ends of the openings and having rounded corners.

HUGH C. LORD.

REFERENCES CITED

The following references are of record in the file of this patent:

UNITED STATES PATENTS

| Number | Name | Date |
|---|---|---|
| 936,008 | Merigoux | Oct. 5, 1909 |
| 982,634 | Reed | Jan. 24, 1911 |
| 1,064,097 | Selzer | June 10, 1913 |
| 1,087,474 | Wellstead | Feb. 17, 1914 |
| 1,113,912 | Roesel et al. | Oct. 13, 1914 |
| 1,166,314 | Beckham | Dec. 28, 1915 |
| 1,175,151 | Johnstone | Mar. 14, 1916 |
| 1,259,290 | Reynolds | Mar. 12, 1918 |
| 1,343,154 | Ostmann | June 8, 1920 |
| 1,405,960 | Wood | Feb. 7, 1922 |
| 1,570,663 | Wyckoff | Jan. 26, 1926 |
| 1,678,631 | Barker | July 31, 1928 |

FOREIGN PATENTS

| Number | Country | Date |
|---|---|---|
| 601,764 | Great Britain | May 12, 1948 |